(12) United States Patent
Wick et al.

(10) Patent No.: US 8,326,944 B1
(45) Date of Patent: Dec. 4, 2012

(54) RECEIVING CONTENT HAVING FEATURES THAT ARE SUPPORTABLE USING CAPABILITIES OF A COMPUTING DEVICE

(75) Inventors: Ryan Alan Wick, Apollo Beach, FL (US); Raymond Emilio Reeves, Olathe, KS (US); John Marvin Jones, III, Overland Park, KS (US); Jeff H. Bryan, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 726 days.

(21) Appl. No.: 12/422,080

(22) Filed: Apr. 10, 2009

(51) Int. Cl.
*G06F 15/16* (2006.01)
*G06F 15/177* (2006.01)

(52) U.S. Cl. ........................... 709/218; 709/220
(58) Field of Classification Search .................. 709/201, 709/220, 218; 717/170–178
See application file for complete search history.

(56) References Cited

U.S. PATENT DOCUMENTS

| | | | | |
|---|---|---|---|---|
| 7,185,335 B2 * | 2/2007 | Hind et al. | ..................... | 717/176 |
| 7,739,681 B2 * | 6/2010 | Sinha et al. | ..................... | 717/173 |
| 7,846,023 B2 * | 12/2010 | Evans et al. | ..................... | 463/42 |
| 2004/0139177 A1 * | 7/2004 | Yook | ............................. | 709/220 |
| 2007/0101197 A1 * | 5/2007 | Moore et al. | ..................... | 714/38 |
| 2009/0164201 A1 * | 6/2009 | Celli et al. | ..................... | 703/21 |

* cited by examiner

*Primary Examiner* — Minh-Chau Nguyen

(57) ABSTRACT

A method, system, and medium are provided for receiving content that has features, which are supportable using capabilities of a computing device. On the computing device, an application is installed or removed. A determination is made as to whether the installation or removal changed an ability of the computing device to support content having certain features. The computing device provides to an interface an indication that describes an ability of the computing device to support content features. The indication is usable by the interface to facilitate an exchange of information between the computing device and a content server.

5 Claims, 6 Drawing Sheets

RECEIVING CONTENT HAVING FEATURES THAT ARE SUPPORTABLE USING CAPABILITIES OF A COMPUTING DEVICE

SUMMARY

Embodiments of the invention are defined by the claims below, not this summary. A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter.

A set of embodied computer-useable instructions relate to receiving content that has features, which are supportable using capabilities of a computing device. In one aspect, on the computing device, an installation of an application is modified, such as by installing or removing the application. A determination is made as to whether the modification of the installation affected the overall capabilities of the computing device, i.e., whether a new capability was added or a former capability was removed. An indication that describes an ability of the computing device to support content features is provided to an interfacing application, which helps to facilitate receipt of content having content features that are supportable.

BRIEF DESCRIPTION OF THE SEVERAL VIEWS OF THE DRAWINGS

Illustrative embodiments of the present invention are described in detail below with reference to the attached drawing figures, wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly stated.

Embodiments of the present invention may be embodied as, among other things, a method, system, or set of instructions embodied on one or more computer-readable media. Computer-readable media include both volatile and nonvolatile media, removable and nonremovable media, and contemplate media readable by a database, a switch, and various other network devices. By way of example, computer-readable media comprise media implemented in any method or technology for storing information. Examples of stored information include computer-useable instructions, data structures, program modules, and other data representations, each of which may be executed by a computer or other machine, such as a personal data assistant or other handheld device. Media examples include information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Generally, program modules including routines, programs, objects, components, data structures, etc., refer to code that performs particular tasks or implements particular abstract data types. The invention may be practiced in a variety of system configurations, including handheld devices, consumer electronics, general-purpose computers, more specialty computing devices, and the like. Embodiments of the invention may also be practiced in distributed computing environments where tasks are performed by remote-processing devices that are linked through a communications network.

Figure 1:
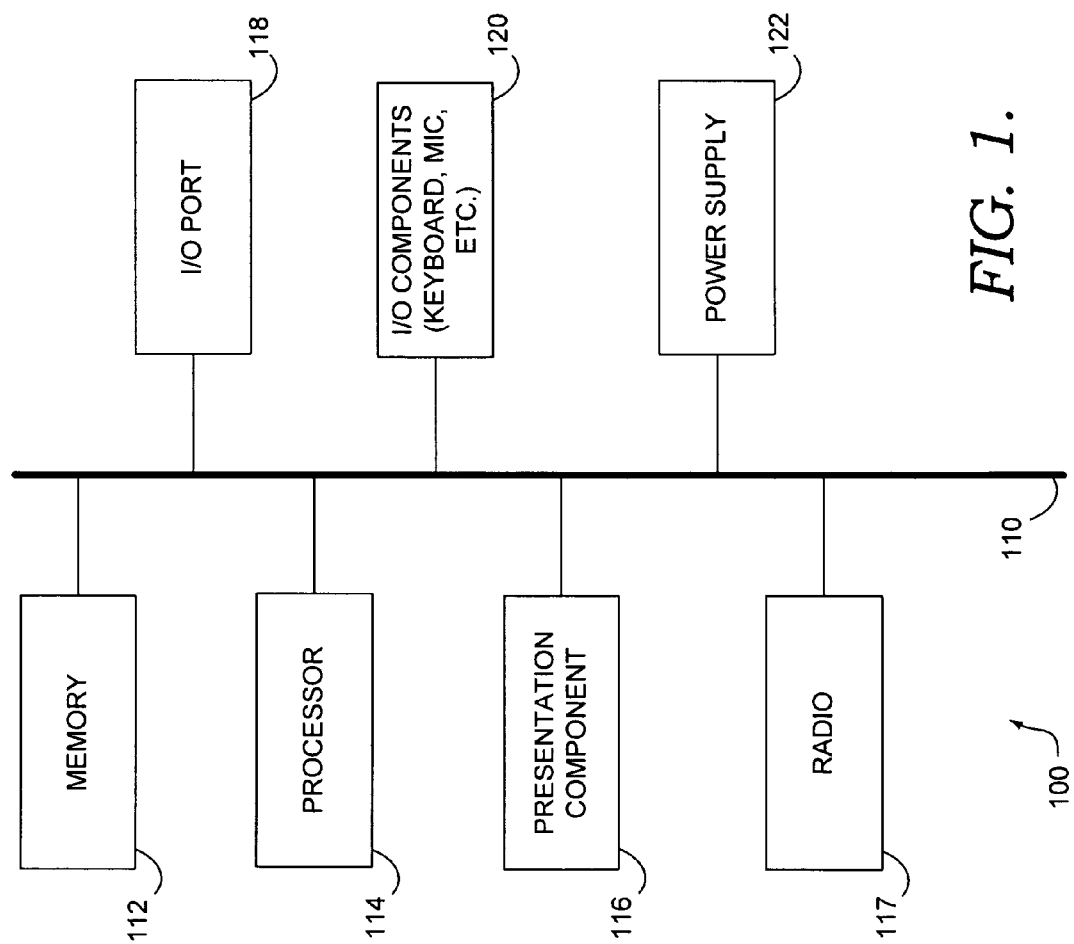
FIG. 1 depicts an illustrative computing device suitable for practicing an embodiment of the present invention.

Turning now to FIG. 1, a block diagram of an illustrative computing device, e.g., mobile device, is provided and referenced generally by the numeral 100. Although some components are shown in the singular, they may be plural. For example, computing device 100 might include multiple processors or multiple radios, etc. Moreover, not all of the components shown in FIG. 1 need to be present in order to make up a computing device but are shown for illustrative purposes in connection with describing an embodiment of our technology. For example, by referring to a computing device, we might be referring only to a processor or memory that is part of another computing device. As illustratively shown, computing device 100 includes a bus 110 that directly or indirectly couples various components together including memory 112, a processor 114, a presentation component 116, a radio 117, input/output ports 118, input/output components 120, and a power supply 122.

We previously have described various memory components that of which memory 112 might take the form. Thus, we will not elaborate more here, only to say that memory component 112 can include any type of medium that is capable of storing information. Processor 114 might actually be multiple processors that receive instructions and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 100. Power supply 122 includes items such as batteries, fuel cells, or any other component that can act as a power source to power mobile device 100.

Figure 2:
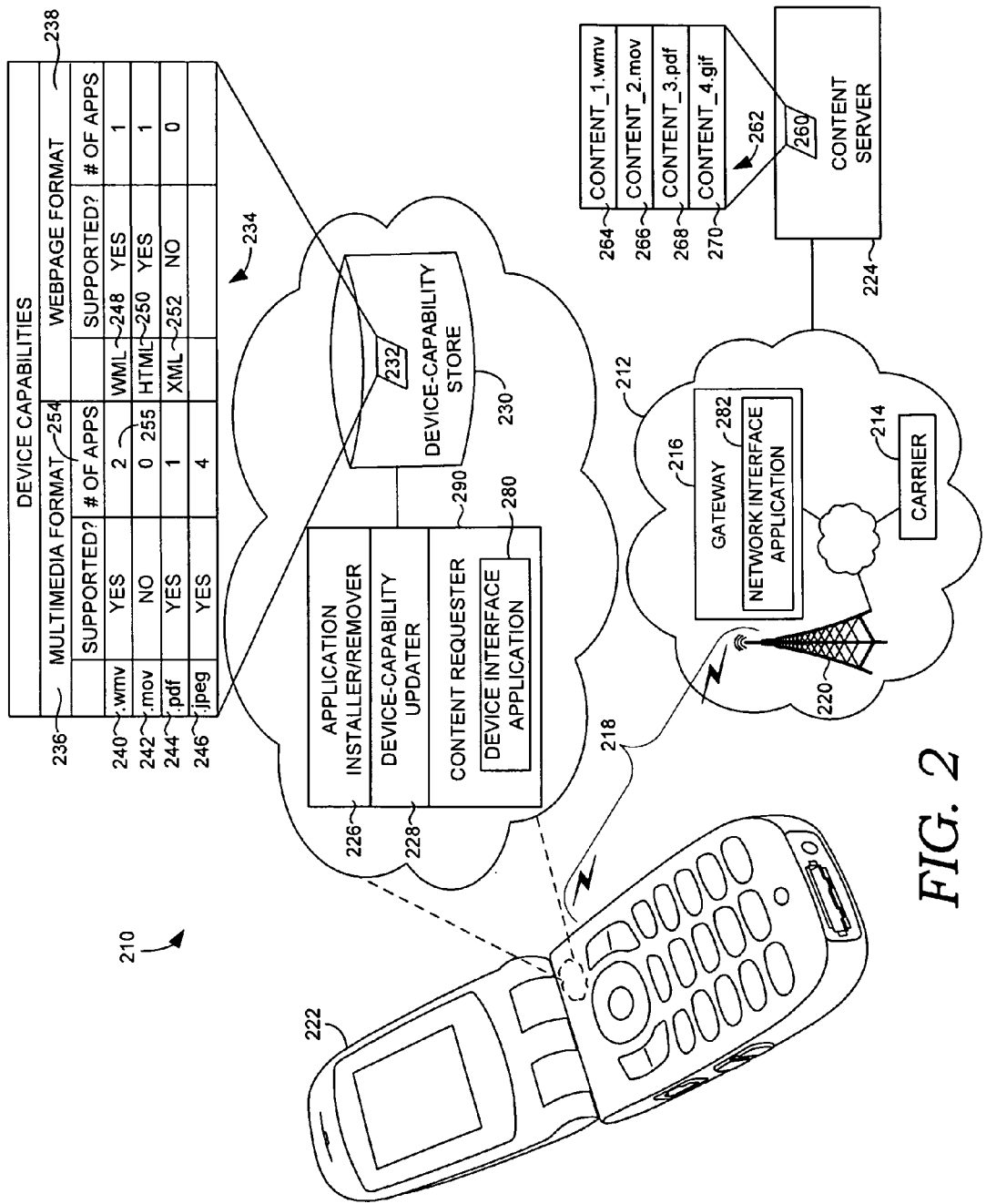
FIG. 2 depicts an illustrative operating environment suitable for practicing a method of receiving content having features that are supportable using capabilities of a computing device in accordance with an embodiment of our technology.

Turning now to FIG. 2, an illustrative operating environment, identified generally by numeral 210, is shown in which embodiments of our technology can be practiced. FIG. 2 depicts a network 212 of various components. For example, network 212 is controlled by carrier 214 and includes a gateway 216. Moreover, network 212 can provide wireless connectivity 218, such as by using a base station or communications tower 220. By way of wireless connectivity 218, mobile device 222 can communicate with network 212. Furthermore, network 212 is in communication with content server 224. For example, network 212 might communicate with content server 224 by way of the Internet or other similar network. Pursuant to operating environment 210, network 212 enables and/or facilitates communication between mobile device 222 and content server 224. In one aspect, mobile device 222 requests to receive content from content server 224, and content server 224 provides requested content to mobile device 222.

In aspects of our technology, mobile device 222 includes various components. In one embodiment, mobile device 222 includes an application installer/remover 226, which is usable by the mobile device to both remove and install applications. Applications are usable by mobile device 222 to perform various functions, such as supporting a version of content having certain features. In aspects of our technology, the term "content" refers to "digital content," which includes audio content, video content, pictorial content, multimedia content, and a combination thereof. Often, content is described as having certain features, such as a file size, format, format type, language, etc. Accordingly, an application might be installed onto mobile device 222 to enable mobile device 222 to support content, e.g., video content, having a certain size and format. Often times application functionality will overlap, such that more than one application installed on mobile device 222 enables mobile device 222 to perform the same function. On the other hand, removal of an application from mobile device 222 might remove altogether an ability to support content having certain features, such that mobile device 222 no longer has an ability to support certain content, which it could previously support.

In aspects of our technology, as applications are installed mobile device 222 can acquire new capabilities, which it did not have prior to an installation, and as applications are removed mobile device 222 can lose former capabilities, which it had prior to a removal. Mobile device 222 includes device-capability updater 228, which communicates with device-capability store 230. Device-capability updater 228 and device-capability store 230 track capabilities of mobile device 222, such as the ability of mobile device 222 to support content having certain features. As depicted, device-capability store 230 includes data 232, which includes a list of content features that are either supported or not supported by mobile device 222. For clarity and illustrative purposes, expanded window 234 of data 232 is shown in FIG. 2. Expanded window 234 includes a column 236, which includes various multimedia formats 240, 242, 244, and 246, and column 238, which includes various webpage formats 248, 250, and 252. Moreover, expanded window 234 includes rows, which indicate whether a content feature is supported, and if it is supported, how many applications on mobile device 222 are usable to support the content feature. For example, expanded window 234 indicates that mobile device 222 has two applications that enable mobile device 222 to support .wmv-formatted files. Expanded window 234 is just one example of how mobile device 222 might store a list of capabilities, and in other embodiments, data 232 might include other types of information that is organized in an alternative manner and that provides a list of capabilities.

In aspects of our technology, device-capability updater 228 determines whether modifying an installation of an application affects overall capabilities of mobile device 222. The phrase "modifying an installation" refers to one or both of installing and removing an application, e.g., application installer/remover 226 is usable to both install and remove applications.

Installing an application might affect overall capabilities of mobile device 222, such as if the application ("newly installed application") adds to mobile device 222 an ability to support content features that were not otherwise supportable prior to the installation. For example, expanded window 234 indicates that no applications are currently usable by mobile device 222 to support .mov-formatted content. Accordingly, if an application were installed onto mobile device 222 that enabled mobile device 222 to support .mov-formatted content, the overall capabilities of mobile device 222 would be affected, i.e., mobile device 222 would now have an ability to support .mov-formatted content although it previously did not prior to the installation. However, expanded window 234 indicates that one application is currently usable by mobile device 222 to support .pdf-format content, such that if an application were installed onto mobile device 222 that enabled mobile device 222 to support .pdf-format content, the overall capabilities of mobile device 222 would not be affected, i.e., mobile device 222 would now have an ability to support the same features as it did prior to the installation.

Device-capability updater 228 might take various steps to determine whether installing an application affects overall capabilities of mobile device 222, i.e., adds a new capability to mobile device 222. In one aspect, upon installation of an application, device-capability updater 228 determines what content features the newly installed application is usable to support. Device-capability updater 228 then references device-capability store 230 to determine if the content feature that is supportable by the newly installed application is already supported by another application. For example, if device-capability updater 228 determines that a newly installed application enables mobile device 222 to support xml-formatted content, device-capability updater 228 can determine, such as by referencing device-capability store 230, that none of the already installed applications are usable to support xml-formatted content, i.e., device-capability updater can determine that the newly installed application affects overall capabilities of mobile device 222 by providing a new capability that is usable to support xml-formatted content. In an alternative example, if device-capability updater 228 determines that a newly installed application enables mobile device 222 to support .pdf-formatted content, device-capability updater 228 can determine, by referencing device-capability store 230, that one already installed application is usable to support .pdf-formatted content, i.e., device-capability updater 228 can determine that the newly installed application does not affect overall capabilities of mobile device 222 because content features, which are supportable using the newly installed application, are already supportable by mobile device 222 using an already installed application.

In addition to determining whether overall capabilities of mobile device 222 are affected, device-capability store 230 is also updated upon installation of a new application. In aspects of our technology, device-capability updater 228 is usable to update information stored in expanded window 234. For example, after determining content features that a newly installed application is usable to support, device-capability updater 228 modifies an appropriate information field, e.g., "# OF APPS" column 254, in expanded window 234 to reflect an updated number of applications that are usable to support those content features. For example, expanded window 234 indicates that two applications are usable to support .wmv-formatted content; however, if a newly installed application is usable to support .wmv-formatted content, information field 255 would be modified to indicate that three applications are usable to support .wmv-formatted content.

In other aspects of our technology, device-capability updater 228 determines if removing an application ("newly removed application") affects overall capabilities of mobile device 222, i.e., if removing an application removes a former capability. Removing an application affects overall capabilities of mobile device 222 if no other application, which is already installed on mobile device 222, is usable to support content features that were supportable using the newly removed application. For example, expanded window 234 indicates that one application is usable to support .pdf-formatted content, such that if a newly removed application was the one application usable to support .pdf-formatted content, overall capabilities of mobile device 222 would be affected by removing the newly removed application, i.e., mobile device 222 would no longer have an ability to support .pdf-formatted content. In an alternative example, expanded window 234 indicates that two applications are usable to support .wmv-formatted content, such that if a newly removed application was usable to support .wmv-formatted content, overall capabilities of mobile device 222 would not be affected by removing the newly removed application, i.e., mobile device 222 would still have an ability to support .wmv-formatted content.

Device-capability updater 228 might take various steps to determine whether removing an application affects overall capabilities of mobile device 222. In one aspect, upon removal of an application, device-capability updater 228 determines content features that the newly removed application was usable to support. Device-capability updater 228 might then update device-capability store 230 by modifying an appropriate information field, e.g., information field 255 under column 254, in expanded window 234 to reduce a number listed under column 254. For example, if a newly removed application was usable to support .pdf-formatted content, device-capability store 230 might be updated to reflect that zero applications are now usable to support .pdf-formatted content. In an alternative example, if a newly removed application was usable to support .jpeg-formatted content, device-capability store 230 might be updated to reflect that three applications are usable to support .jpeg-formatted content.

In aspects of our technology, device-capability updater 228 determines if removing an application affected the overall capabilities of mobile device 222, i.e., if removing an application removed a former capability of the mobile device. For example, after column 254 is updated consistent with removing an application, device-capability updater 228 might reference device-capability store 230 to determine if any other applications, which are still installed on mobile device 222, are usable to support content features that were supportable using the newly removed application. For example, if a newly removed application was usable by mobile device 222 to support .pdf-formatted content, column 254 would be modified to reflect that zero applications are usable to support .pdf-formatted content, thereby indicating a change in the overall capabilities of mobile device 222 would be detected, i.e., modifying column 254 to reflect a zero value indicates that mobile device 222 no longer has an ability to support content features, which it previously was able to support.

As previously described, modifying an installation of an application can affect an ability of mobile device 222 to support content having certain features. Content can be provided by a variety of sources. For example, content server 224 includes data 260, which is illustratively shown in an expanded window 262. Data 260 includes various content 264, 266, 268, and 270, each of which has content features, which are indicated by a file extension (e.g. .gif). Content server 260 can provide content 264, 266, 268, and 270 to requesting parties, e.g., mobile device 222. Accordingly, modifying an installation of an application can affect ability of mobile device 222 to support content 264, 266, 268, and 270.

Aspects of our technology include providing to other components an indication, which describes whether mobile device 222 has ability to support content having a certain feature. In one embodiment, an indication is provided to an interfacing application, which facilities an exchange of information between mobile device 222 and content server 224. For example, an interfacing application might receive from content requester 290 a request to receive content 264 from content server 224. An interfacing application facilitates communication by modifying the request to include information that is usable by content server 224 to respond to the request. For example, an interfacing application might modify the request by populating a header to include information, which describes content features that are supportable using applications installed on mobile device 222. In one embodiment, an interfacing application is installed and operates on mobile device 222, e.g., device interface application 280. In an alternative embodiment, an interfacing application is installed and operates on gateway 216, e.g., network interface application 282.

In aspects of our technology, an indication is provided from device-capability updater 228 to device interface application 280, i.e., the indication is provided from one component of mobile device 222 to another component of mobile device 222. In an alternative embodiment, an indication is provided from device-capability updater 228 to network interface application 282, i.e., the indication is provided from a component of mobile device 222 to a network component.

Figure 3:
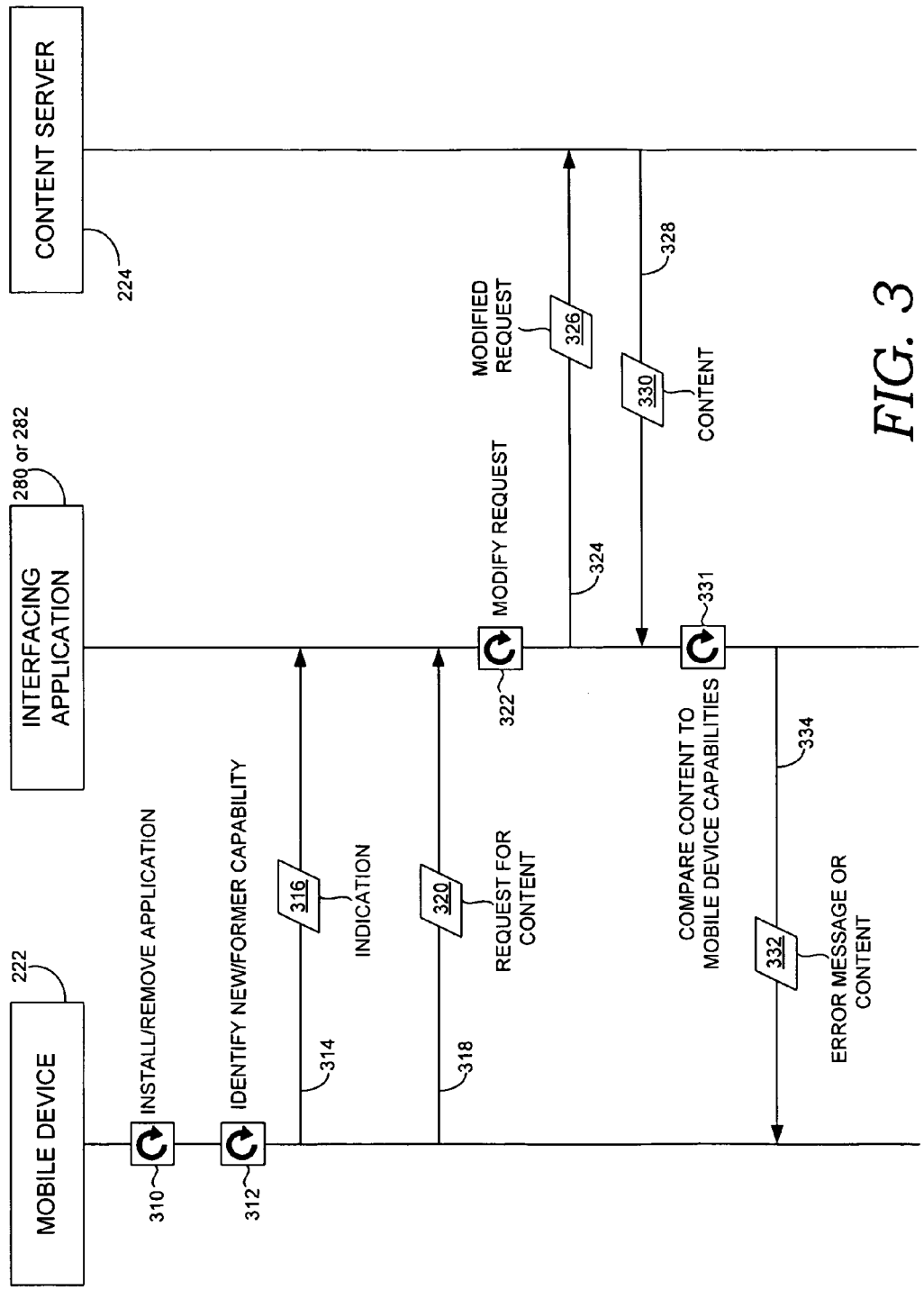
FIGS. 3-6 each depict an illustrative method of receiving content having features that are supportable using capabilities of a computing device in accordance with an embodiment of our technology.

Turning now to FIG. 3, an illustrative flow diagram depicts an interaction between mobile device 222, an interfacing application 280 or 282, and content server 224. Step 310 includes modifying an installation of an application, e.g., installation and/or removal of an application. At step 312 a determination is made as to whether a new capability was added to mobile device 222 or a former capability was removed from mobile device 222. For example, as previously described with respect to FIG. 2, device-capability updater 228 communicates with device-capability store 230 to determine if overall capabilities of mobile device 222 are affected. Step 314 includes sending an indication 316 to interfacing application 280 or 282. In an exemplary embodiment, indication 316 describes a content feature that is supportable using a new capability, which is provided by an application that was installed on mobile device 222. In another exemplary embodiment, indication 316 describes an inability of mobile device 222 to support a content feature, that was previously supportable using a former capability provided by an application that was removed from mobile device 222. At step 318, a request 320 to receive content is sent from mobile device 222 to interfacing application 280 or 282. Although depicted as being sent separately in FIG. 3, in some embodiments indication 316 is sent together with request 320. Step 322 includes modifying the request consistent with indication 316. For example, information might be added to request 320 to describe a content feature that is supportable by mobile device 222 using a new capability. Alternatively, information might be added to request 320 to describe a content feature that is not supportable by mobile device 222. At step 324 a modified request 326 is sent from interfacing application 280 or 282 to content server 224. Content server 224 responds to the modified request at step 328 by providing content 330. Content 330 is received by interfacing application 280 or 282, which can take various actions, such as comparing 331 features of content 330 to capabilities of mobile device 222. If content 330 includes features that are not supportable by mobile device 222, in one aspect, interfacing application 280 or 282 blocks content 330 from being received by mobile device 222. Instead, an error message 332 might be provided 334 to mobile device 222. In an alternative embodiment, if content 330 includes features that are supportable by mobile device 222, interfacing application 280 or 282 forwards 334 content 332 to mobile device 222.

Figure 4:
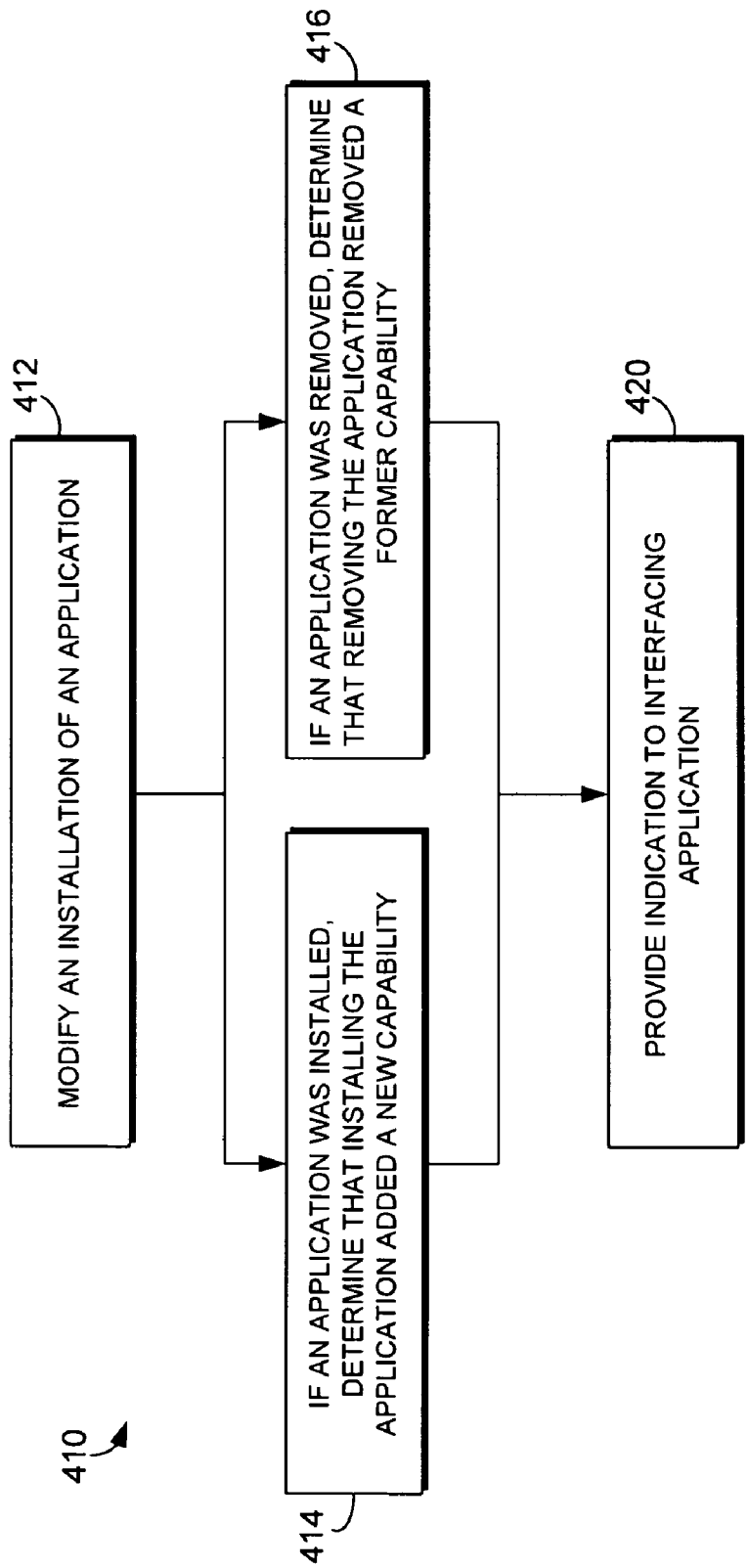

Referring now to FIG. 4, an illustrative method, identified generally by the numeral 410 is depicted. Method 410 illustrates a method of receiving content, e.g., content 264, 266, 268, and 270 that has features, which are supportable using capabilities of a computing device, such as those capabilities described in expanded window 234. Step 412 includes, on the computing device, modifying an installation of an application that enables the computing device to support a feature associated with content to be received. For example, modifying the installation can include installing the application onto the computing device. However, modifying the installation can also include removing the application from the computing device. If the application is installed, step 414 includes determining that installing the application added to the computing device a new capability that is usable to support the feature. For example, as previously described, device-capability updater 228 might communicate with device-capability datastore 230 to determine that a new capability was added. Alternatively, if the application is removed, step 416 includes determining that removing the application removed from the computing device a former capability. Again, device-capability updater 228 might communicate with device-capability datastore 230 to make such a determination. At step 420 an indication is provided to an interfacing application, e.g., device interface application 280 or network interface application 282. The indication describes whether the computing device has an ability to support a feature and is usable by the interfacing application to modify a request to receive content.

Figure 5:
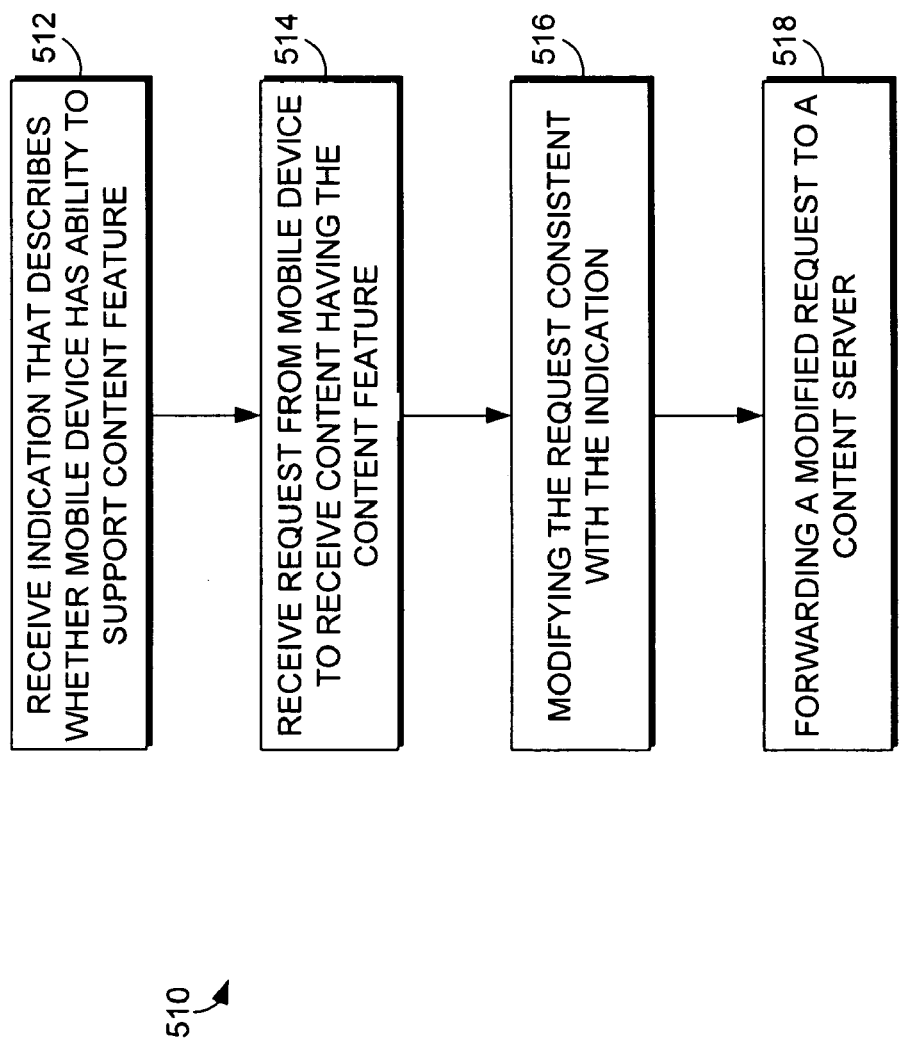

Referring now to FIG. 5, an illustrative method, identified generally by the numeral 510, is depicted. Method 510 illustrates a method of receiving content that has features, which are supportable using capabilities of a mobile device. Step 512 includes receiving from the mobile device an indication that describes whether the mobile device has an ability to support a feature of the content. For example, the indication is received by an interfacing application, which is installed on either the mobile device or a gateway component. At step 514 a request is received from the mobile device to receive content that is provided by a content server. Step 516 includes modifying the request consistent with the indication to include information that describes an ability of the mobile device to support the feature. At step 518, the content server is notified of the ability of the mobile device to support the feature. For example, a modified request is communicated to the content server.

Figure 6:
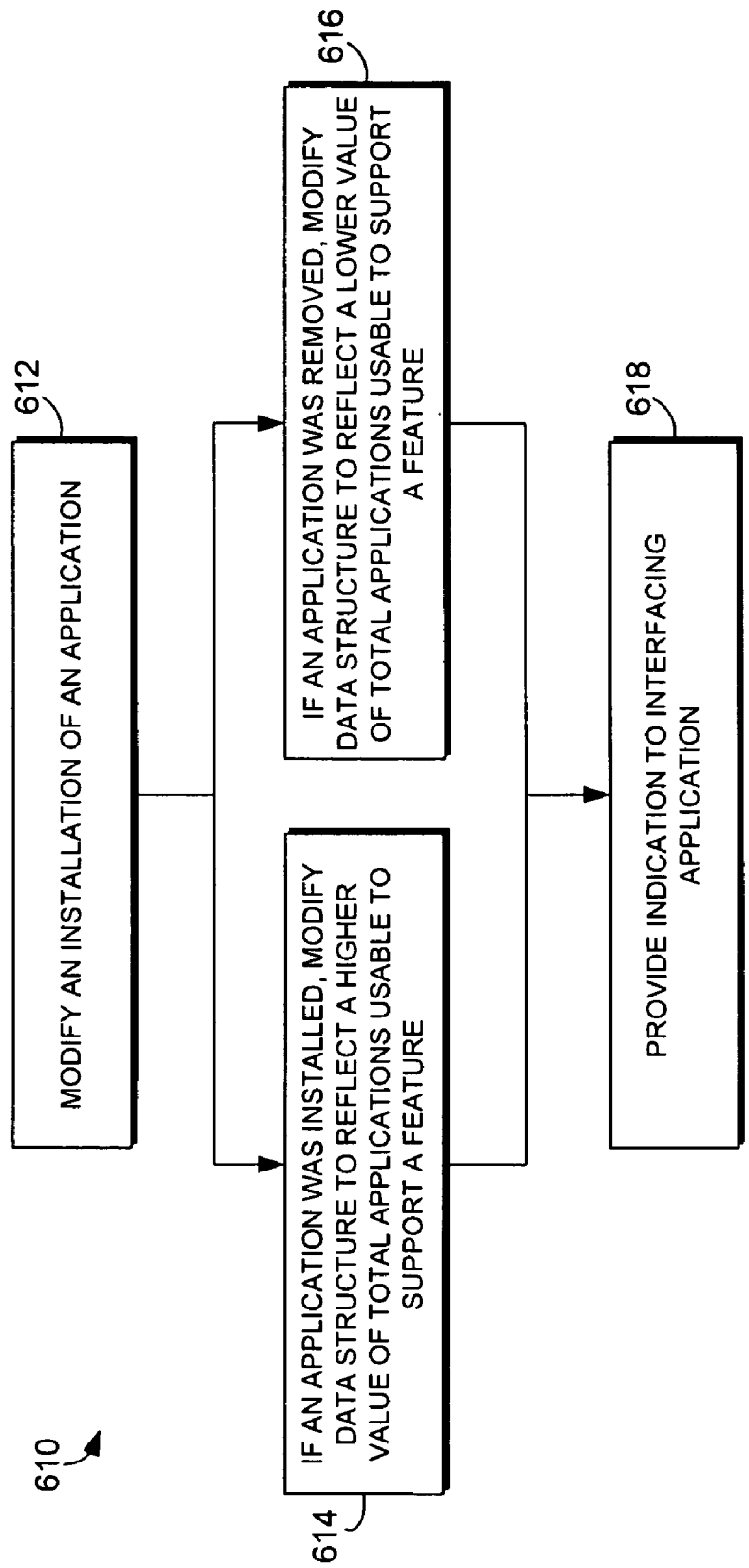

Another aspect of our technology is depicted in FIG. 6, which describes a method identified generally by numeral 610. Step 612 includes, on the computing device, modifying an installation of an application that enables the computing device to support a feature associated with content to be received. For example, modifying the installation can include installing the application onto the computing device. However, modifying the installation can also include removing the application from the computing device. Steps 614 and 616 include modifying in a datastore a data structure that correlates to a total number of applications that enable the computing device to support the feature. In one embodiment in which the application is installed, step 614 includes modifying the data structure to reflect a higher value of the total number of applications, such that installing the application added a new capability to the computing device if, prior to installation of the application, the total number of applications that enabled the computing device to support the feature was zero. In another embodiment in which the application is removed, step 616 includes modifying the data structure to reflect a lower value of the total number of applications, such that removing the application removes a former capability of the computing device if, after removing the application, the total number of applications that enable the computing device to support the feature is zero. At step 618 an indication is provided to an interfacing application, Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory computer-readable media storing computer-executable instructions thereon that, when executed, cause a mobile computing device to perform a method of receiving content that has features that are supportable using capabilities of the mobile computing device, the method comprising:
   on the mobile computing device, removing an installation of an application, which provides a capability to the mobile computing device that enables the mobile computing device to support a feature associated with content to be received;
   transforming by the mobile computing device a list of capabilities of the mobile computing device to indicate that the capability enabling the mobile computing device to support the feature is not provided by any application installed on the mobile computing device;
   providing to an interfacing application running on the mobile computing device a notification, which indicates that the mobile computing device does not support the feature, wherein the interfacing application facilitates transmission of content requests from the mobile computing device to content servers;
   detecting by the interfacing application that a request to receive a content item is to be sent from the mobile computing device to a content server; and updating data of the request to indicate that the mobile computing device does not support the feature, wherein the request that has been updated is transmitted from the mobile computing device to the content server.

2. The media of claim 1, wherein the feature includes a multimedia file format.

3. The media of claim 1, wherein the feature includes a webpage file format.

4. The media of claim 1, wherein the feature includes a file size.

5. A method of receiving content having features that are supportable using capabilities of the mobile computing device, the method comprising:
- on the mobile computing device installing an application that provides a capability to the mobile computing device that enables the mobile computing device to support a feature associated with content to be received;
- transforming by the mobile computing device a list of capabilities of the mobile computing device to indicate that the capability enabling the mobile computing device to support the feature is provided by some application installed on the mobile computing device;
- providing to an interfacing application running on the mobile computing device a notification, which indicates that the mobile computing device supports the feature, wherein the interfacing application facilitates transmission of content requests from the mobile computing device to content servers;
- detecting by the interfacing application that a request to receive a content item is to be sent from the mobile computing device to a content server; and
- updating data of the request to indicate that the mobile computing device supports the feature, wherein the request that has been updated is transmitted from the mobile computing device to the content server.

* * * * *